US008327687B2

(12) United States Patent
Amann et al.

(10) Patent No.: US 8,327,687 B2
(45) Date of Patent: Dec. 11, 2012

(54) EVALUATION OF NON-FUEL COMPONENTS ON ENGINE KNOCK PERFORMANCE

(75) Inventors: Manfred Amann, San Antonio, TX (US); Terrence F. Alger, II, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 478 days.

(21) Appl. No.: 12/689,553

(22) Filed: Jan. 19, 2010

(65) Prior Publication Data
US 2011/0174055 A1 Jul. 21, 2011

(51) Int. Cl.
*G01L 23/22* (2006.01)
(52) U.S. Cl. ....................................................... 73/35.12
(58) Field of Classification Search .................. 73/35.01, 73/35.02, 35.12
See application file for complete search history.

(56) References Cited

U.S. PATENT DOCUMENTS

| 4,364,260 | A  | * | 12/1982 | Chen et al. | ............... | 73/35.03 |
| 7,603,981 | B2 | * | 10/2009 | Tanaka | ............... | 123/406.3 |
| 8,014,933 | B2 | * | 9/2011 | Joos et al. | ............... | 701/111 |
| 8,129,320 | B2 | * | 3/2012 | Amann et al. | ............... | 508/492 |

OTHER PUBLICATIONS

Wikipedia, "Motor Oil," available at http://en.wikipedia.org/wiki/Engine_oil retrieved on Dec. 17, 2009.

* cited by examiner

*Primary Examiner* — Freddie Kirkland, III
(74) *Attorney, Agent, or Firm* — Grossman, Tucker et al.

(57) ABSTRACT

The present invention relates to methods and apparatus for the evaluation of non-fuel components within a selected fuel with respect to engine knock performance. A non-fuel component such as a lubricant oil is now evaluated to determine onset of engine knock relative to baseline oil formulations that indicate relative low reactivity and optimum engine performance and those engine oils that exhibit relatively high reactivity and sub-optimum engine performance.

27 Claims, 4 Drawing Sheets

EVALUATION OF NON-FUEL COMPONENTS ON ENGINE KNOCK PERFORMANCE

FIELD OF THE INVENTION

The present disclosure relates to the evaluation of non-fuel components within a selected fuel with respect to engine knock performance. For example, a non-fuel component such as a lubricant oil may now be evaluated in order to achieve improved knock-resistance, fuel efficiency and/or power generation in spark-ignited engines operating with gasoline or other alternative fuel sources.

BACKGROUND

Internal combustion engine designs often seek to operate at relatively higher specific power levels in an effort to improve vehicle fuel efficiency. For example, to reduce engine displacement one may use a pressure charging system, such as a turbocharger, to maintain the power and torque of a relatively large engine, which may then improve the vehicle's fuel efficiency. When a relatively smaller engine displaces a larger engine in a given vehicle, the new vehicle may have better fuel economy due to the reduction in throttling losses, as a relatively smaller engine needs to open the throttle more to achieve similar torque as in a relatively larger engine. However, as the smaller engine may then operate at higher specific power levels, the efficiency gains may be reduced by the presence of knock. Knock is referenced within this application to the presence of detonation or auto-ignition, resulting from relatively high temperature conditions, which typically occur at high specific power levels, causing auto-ignition of unburned gases in the cylinder. Knock may produce objectionable noise and may also lead to catastrophic engine failure.

Engine lube oil is intentionally coated on a cylinder to reduce friction and prevent ring and liner wear. Some of this lubricant may therefore enter the boundary layer of the cylinder and the combustion chamber in the end gas region (the region of the last gas to burn). It may therefore be useful to evaluate (e.g. quantify) lubricant effects on engine knock performance which may then be used to identify lubricants yielding relatively lower fuel consumption, due to the ability of an engine to operate at relatively high compression ratios and/or closer to a point of maximum engine efficiency. It may also be useful to identify, for a given lubricant, the tendency of the oil to knock within a given fuel with respect to selected engine operating parameters, such as spark advance, compression ratio, intake air temperature, coolant temperature, oil temperature and/or peak torque at minimum advanced spark timing.

SUMMARY

In a first exemplary embodiment, the present disclosure relates to a method for evaluating non-fuel components within a selected fuel with respect to engine knock performance in a selected spark-initiated combustion engine. The method comprising determining the onset of engine knock for a first non-fuel component in a selected fuel mixture under engine operating conditions which provides optimum engine performance and then determining the onset of engine knock for a second non-fuel component in a selected fuel mixture under engine operating conditions which provides sub-optimum engine performance. This may then be followed by a determination of the onset of engine knock for a selected non-fuel component in said selected fuel relative to said first and second non-fuel components.

In a second exemplary embodiment the present disclosure relates to a method for evaluating lubricant oils within a selected fuel with respect to engine knock performance in a selected spark-initiated combustion engine comprising determining the onset of engine knock for a first relatively low reactivity lubricant oil in a fuel mixture under engine operating conditions which provides optimum engine performance. This may then be followed by determining the onset of engine knock for a second relatively high reactivity lubricant oil in a fuel mixture under engine operating conditions which provides sub-optimum engine performance. This may then be followed by a determination of the onset of engine knock for a selected lubricant oil relative to said first relatively low reactivity lubricant oil and said second relatively high reactivity lubricant oil.

In a third exemplary embodiment the present disclosure relates to an article comprising a storage medium having stored thereon instructions that when executed by a machine result in the following operations: determining the onset of engine knock for a first non-fuel component in a selected fuel mixture under engine operating conditions which provides optimum engine performance; determining the onset of engine knock for a second non-fuel component in a selected fuel mixture under engine operating conditions which provides sub-optimum engine performance; and determining the onset of engine knock for a selected non-fuel component in the selected fuel relative to said first and second non-fuel components.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
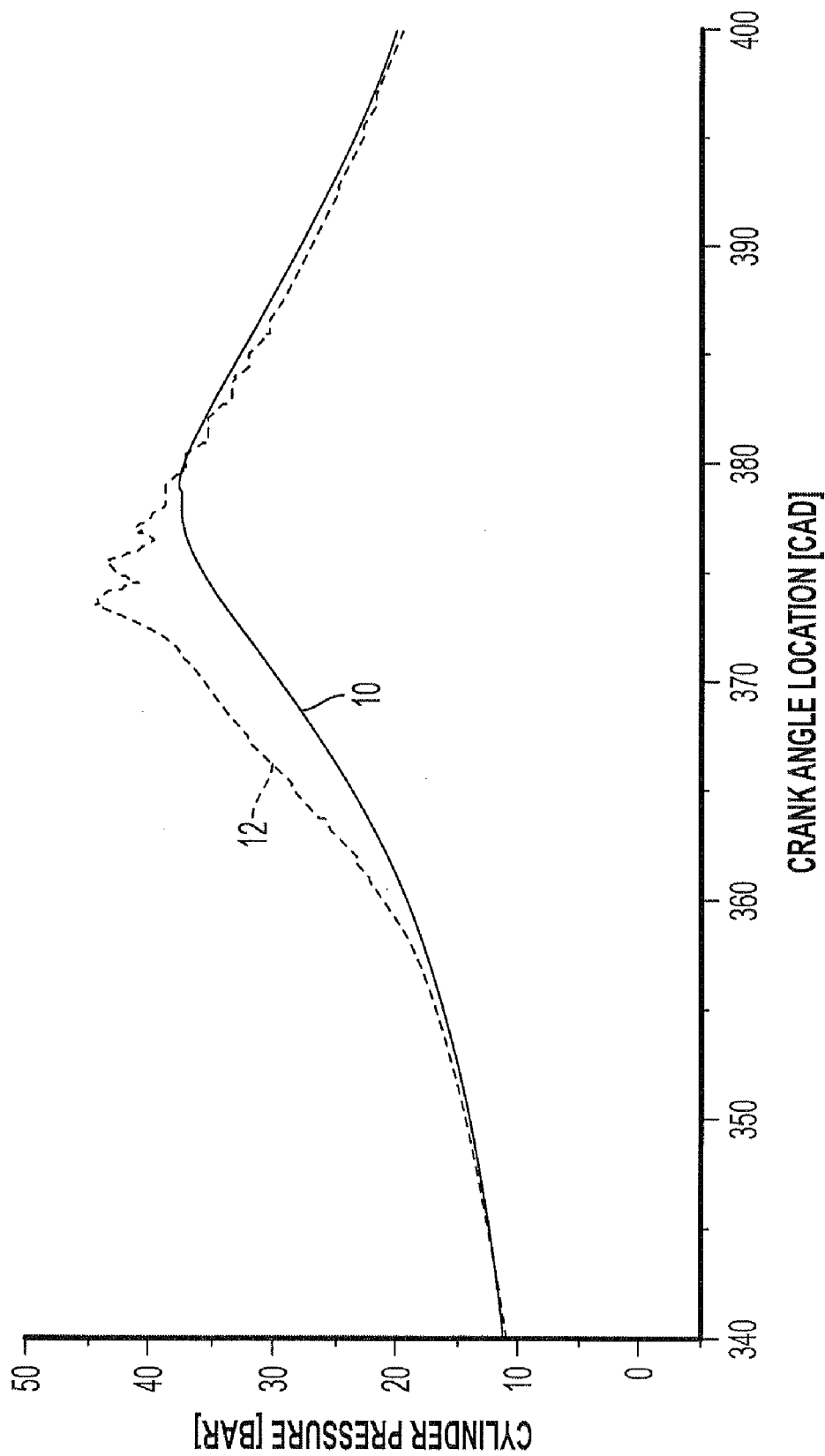
FIG. 1 is a plot of cylinder pressure (bar) versus crank angle location (CAD).

As noted above, the combustion characteristics of a given non-fuel ingredient herein may now be evaluated and considered as a consequence of its ability to influence the combustion process within the cylinder of an internal combustion engine. In addition, a given non-fuel ingredient may now be evaluated with respect to engine operating parameters. More specifically, a method is disclosed that allows one to measure and quantify a non-fuel ingredient such as a lubricant and its corresponding effect on engine knock performance.

The method herein may be applied to internal combustion engines, i.e. engines in which the combustion of a fuel (generally, fossil fuel) occurs with an oxidizer (usually air) in a combustion chamber. In an internal combustion engine the expansion of the high temperature and pressure gases, which are produced by the combustion, directly applies force to a movable component of the engine, such as the pistons or turbine blades and by moving it over a distance, generate useful mechanical energy. For example, the methods herein may be applied on a fuel-injected spark-initiated engine where it is important to control the air/fuel ratio for repeatable knock measurements.

The methods herein to evaluate knock-performance were initially applied to a single-cylinder variable compression ratio engine, however, the methods herein may be generally applied to any internal combustion engine design wherein a non-fuel component such as engine lubricant may be used and engine knock becomes an issue as a consequence of the presence of such lubricant. Accordingly, to confirm the applicability of the methods herein, a single-cylinder engine was utilized that was equipped with a port fuel injection system along with temperature control for engine coolant, engine oil and intake air. A variable compression ratio (VCR) was used to monitor the effect of such parameters on engine knock. The single-cylinder VCR engine had the following geometry: bore 96.8 mm; 95.3 mm; displacement 702 cc; compression ratio 8.4:1 to 18.9:1;

As engine knock may tend to be dependent upon engine operating variables, it was found useful to control such engine operating variables for the methodology disclosed herein. This is discussed more fully herein. At this point, it may be appreciated that such control was found to provide relatively more reproducible results in the engine knock characterization methods described herein.

It was also advantageous in the development of the methods herein to utilize a well-characterized baseline fuel. That is, a fuel of generally reproducible combustion characteristics, which therefore brings into sharper focus the evaluation of knock characteristics of the non-fuel component (e.g. lubricant) at issue. For example, it was found preferable to utilize an EEE reference fuel from Halterman Products. Such fuel is characterized as having a density of 0.734-0.744 kg/l, Reid Vapor Pressure of 8.8-9.2 psi, a carbon weight fraction of 0.8650 (ASTM D3343), a hydrogen weight fraction (ASTM E191) of 0.1348, an oxygen content (ASTM D4815) of less than 0.05 wt. %, a research octane number (ASTM D2699) of 97.0 and a motor octane number (ASTM D2700) of 87.9. In addition, one may also utilize primary reference fuels (PRF) containing blends of two ingredients, iso-octane and n-heptane, where the octane level and associated octane number may vary depending upon the internal combustion engine at issue and engine operating requirements. However, once again, as long as the fuel utilized was relatively constant in its composition, reliable evaluations of engine knock of a given non-fuel component may be achieved.

To evaluate engine knock, it can first be appreciated that spark-initiated engine knock may be characterized by relatively high frequency pressure waves during the combustion process. Typical pressure waves for knock are in the range of 3.0 to 6.0 kHz. By contrast, combustion pressure waves in the absence of knock may typically be at about 15 Hz to 100 Hz. It should also be noted that the exact frequencies may be a function of engine geometry and may need to be evaluated once a final engine selection is identified. Furthermore, one may utilize a high-pass or band width filter to improve the ability to monitor engine knock pressure waves relative to other engine pressure waves. Accordingly, knock pressure waves due to a non-fuel component such as a lubricant may be detected by filtering the in-cylinder pressure measurements. The sampling rate and placement of the pressure transducer may also be optimized to improve the ability to detect and monitor engine knock behavior.

Engine knock may therefore be monitored using the following three-analysis methods, and attention is first directed to FIG. 1, which is a plot of cylinder pressure (bar) versus crank angle location (CAD). Shown at 10 is the plot for a normal engine cycle, where knocking is not present. Shown at 12 is the plot for those conditions in which knock may be observed due to the presence of a given lubricant. That is, and as explained more fully below, knock can be evaluated for the lubricant with respect to various engine operating parameters.

As can be seen, the presence of knock leads to the above referenced relatively high frequency pressure waves. In FIG. 1, it can be noted that for the normal engine cycle, spark was initiated at a CAD of about 340, top dead center was at a CAD of about 360 and combustion was complete at a CAD value of about 375. As may also be appreciated, the cylinder pressures may be monitored by placement of a pressure transducer in the cylinder under consideration, with the appropriate filtering of selected frequencies, as noted herein.

Figure 2:
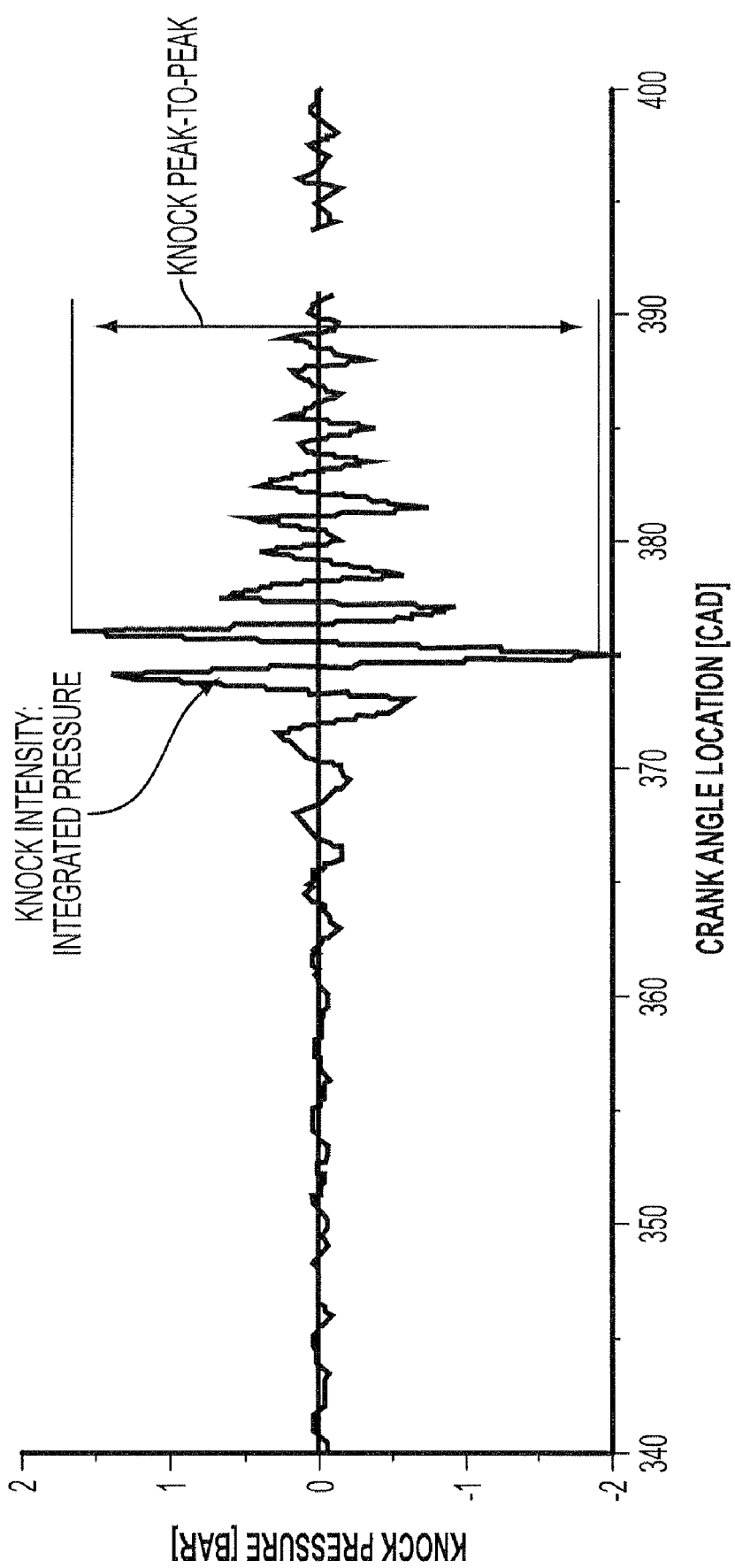
FIG. 2 is a plot of knock intensity integrated pressure (bar) versus crank angle location (CAD) of the knock cycle illustrated in FIG. 1.
Figure 3:
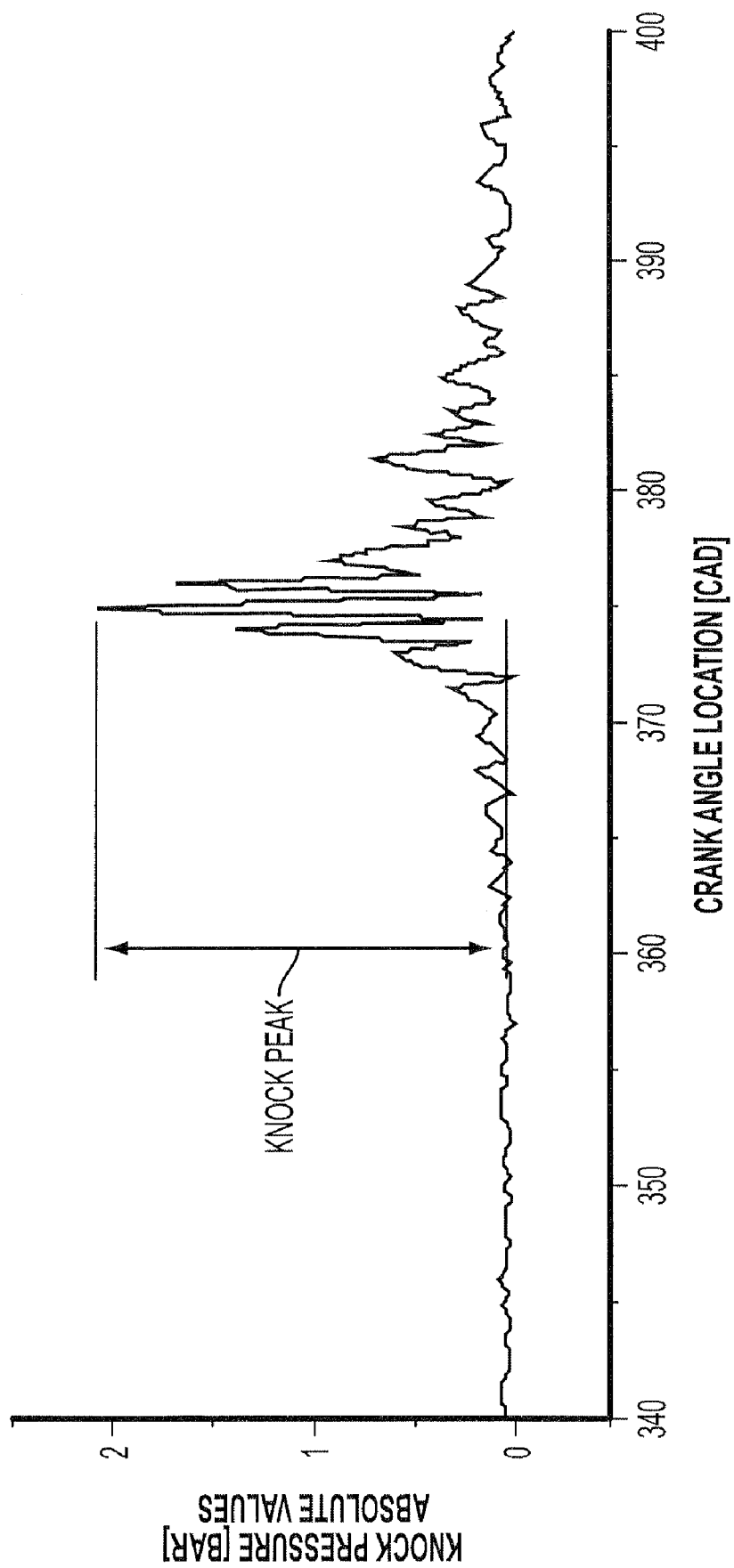
FIG. 3 is a plot of the absolute value of knock intensity integrated pressure shown in FIG. 2, versus crank angle location (CAD).

FIG. 2 provides a plot of knock intensity, which amounts to the integrated pressure (bar) versus CAD for the knock cycle in FIG. 1. More specifically, the area under the peaks corresponds to the integrated pressure and as shown, the knock peak-to-peak values may also be determined. With attention next to FIG. 3, the absolute values of the knock pressure (bar) shown in FIG. 2 may be plotted against the CAD, so that all values are positive, and as can be seen, the values for this range between zero and 2.0. Accordingly, in the context of the present disclosure, the following knock limits for a non-fuel additive (e.g. a lubricant) may be determined, based upon the identified integrated pressure values: (1) Knock intensity of $\leqq 0.15$: acceptable knock performance and acceptable spark-initiated engine combustion; (2) Knock intensity of >0.15 and $\leqq 0.5$: onset of audible knock and/or generally minimal engine damage after prolonged operation; (3) knock intensity of 0.5 to less than 5.0: knocking is present; knock intensity of $\geqq 5.0$: severe knock, engine damage likely within a few cycles (e.g. $\leqq 20$ cycles).

As alluded to above, the above protocol for evaluating knock for a given non-fuel additive may be preferably applied herein to lubricants. Such lubricants may be understood herein to be those oils that are derived from petroleum-based and/or non-petroleum synthesized chemical compounds. Motor oils may therefore include oils composed of hydrocarbons (mineral, poly-alphaolefins), where the bulk of the oil may consist of hydrocarbons with between 18 to 34 carbon atoms per polymer molecule. The lubricating oils which may now be evaluated for knock performance may include either single grade or multi-viscosity type oil formulations.

In addition, as also noted above, knock can be evaluated here for various lubricants with respect to selected engine operating parameters. For example, the following seven (7) parameters may all be evaluated with respect to their influence on the development of engine knock for a given non-fuel component: (1) spark advance; (2) engine speed; (3) torque; (4) coolant temperature; (5) oil temperature; (6) inlet air temperature; (7) compression ratio; (8) minimum spark timing advance for best torque (MBT timing). More specifically, if one desires to evaluate the knocking characteristics of a given lubricant, with respect to spark advance, one may vary spark advance to the point where a selected knock intensity value is obtained, while holding the other seven engine operating parameters relatively constant. That is, reference to holding the other seven parameters as relatively constant may be understood as controlling such parameters during operation of the engine such that the values assigned for knock intensity for a given lubricant reflect spark advance and not the other six values. Accordingly, as long as the other seven values are maintained within targeted and reproducible levels, while the influence of spark advance is investigated, reliable and reproducible values of knock intensity for a given lubricant as a function of spark advance may now be obtained.

Expanding upon the above, below is a table which identifies suggested target values and tolerances that may be considered to allow for reproducible values of engine knock intensity in the procedures noted herein:

| Parameter | Suggested Target Value(s) | Tolerance |
|---|---|---|
| Engine Speed | 500-6000 rpm | ±5 rpm |
| Load BMEP | 5.0-20.0 bar | ±0.05 bar |
| Coolant Temp | 90-110° C. | ±1.0° C. |
| Oil Temp | 90-120° C. | ±1.0° C. |
| MAT | 20-60° C. | ±0.5° C. |
| Lambda | 0.85-1.25 | ±0.015 |
| Combustion Phasing/ Spark Advance | 40.0--20.0 deg before TDC | ±0.25 deg |
| Compression Ratio | 6:1-15:1 | ±0.1 |

Given the above, it may now be appreciated the for a given lubricant, one may run the following evaluations with respect to quantifying the effects of a given non-fuel component (e.g. a lubricant), on the tendency to knock, in a spark-initiated gasoline engine:

1. Knock limited spark advance holding relatively constant engine speed, torque, coolant temperature, oil temperature, inlet air temperature and compression ratio.
2. Knock limited compression ratio holding relatively constant engine speed, torque, coolant temperature, oil temperature, inlet air temperature and spark advance.
3. Knock limited intake air temperature holding relatively constant engine speed, torque, coolant temperature, oil temperature, inlet air temperature and spark advance.
4. Knock limited coolant temperature holding relatively constant engine speed, torque, inlet air temperature, compression ratio and spark advance.
5. Knock limited oil temperature holding relatively constant engine speed, torque, coolant temperature, inlet air temperature, compression ratio and spark advance.
6. Knock limited peak torque at minimum spark advance for best torque holding relatively constant engine speed, inlet air temperature, coolant temperature, oil temperature and compression ratio.

It may now be appreciated that a typical testing procedure of a non-fuel component such as a lubricant oil may initially be directed at a selected baseline oil, which may be first understood as a relatively low reactivity oil. For such low reactivity oil the knock intensity levels noted above, as a function of one or more of the following individual parameters, may be established: (1) spark advance, (2) engine speed, (3) torque, (4) coolant temperature, (5) oil temperature, (6) inlet air temperature, (7) compression ratio, and (8) minimum spark timing advance for best torque. Of these values, it may be noted that engine speed was not typically observed to greatly influence knocking tendency. Elaborating, it may be appreciated that if every engine control is maintained, an increase in engine speed might reduce some knock tendency, however, it has been observed that the relation between engine speed and knock intensity is not linear, thus restricting the use of engine speed as a knock control variable.

Reference to relatively low reactivity lubricant oil may therefore amount to that feature where such low reactivity baseline oil is one that provides, for a given engine under consideration, optimum engine performance. Optimum engine performance may be understood as the most advanced relative spark timing, and/or maximum relative torque, and/or relatively high coolant temperature, and/or relatively high oil temperature, and/or relatively high inlet air temperature, and/or relatively high compression ratio. Such engine operating parameters are established in the absence of a knock that may otherwise be unacceptable for satisfactory combustion performance and prolonged engine operation. Preferably, such baseline low reactivity oil may therefore be one that provides any one or more of the aforementioned engine operating conditions with a knock intensity value herein of $\leqq 0.15$.

Examples of a low reactivity lubricant oil may preferably include a single weight blended lubricant oil formulation. For example, this may include a lubricant utilizing an ester base stock oil. More specifically, the base stock oils herein may also preferably include the alkyl based esters of dicarboxylic acid (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

One particularly preferred base stock oil containing ester functionality includes the phthalate esters, commercially available from ExxonMobil under the name ESTEREX™ P81. Another suitable base stock oil containing ester functionality includes Mobil Jet Oil 254, which is identified as a hindered-ester base stock formulation that includes a built-in chemical additive package. Furthermore, another preferred base stock oil with ester functionality includes esters of trimellitic anhydride (TMA), otherwise known as trimellitate esters (TME). Such esters are also commercially available from ExxonMobil under the name ESTEREX™ TM101 Trimmellitate Esters.

Reference to a lubricant oil herein may be understood as a composition that includes a base stock oil (e.g. the alkylated naphthalene and/or ester type oils noted above) and other appropriate additives. For example, the lubricant oil may include the base stock oil at a concentration of at least about 50% wt., more preferably at a level of 75% wt. to 98% wt, even more preferably at a level of 80% wt. to 98% wt. The additives may therefore be present at a level of up to about 50% wt., more preferably in the range of 2% wt. to 20% wt. The additives may be selected from antioxidants, antiwear or extreme pressure compounds (e.g. metal alkylthophosphates, sulfurized olefins, esters of glycerols), viscosity improvers (hydrocarbons at molecular weights of 10,000 to 1,000,000, polymers and copolymers of methacrylate, butadiene, olefins or alkylated styrenes), detergents (alkali or alkaline earth metal salts of sulfonates, phenates, carboxylates, phosphates and salicylates), dispersants, pour-point depressors, corrosion inhibitors/metal deactivators, seal-compatibility additives, anti-foam agents, antirust additives and friction modifiers.

Another relatively low reactive lubricant oil may be a single weight blended lubricant based upon an alkylated napthalenes base stock, such as ExxonMobil Synesstic™ 12. Such alkylated naphthalene base stock may similarly include an additive package including anti-wear and anti-oxidation additives along with friction modifiers.

The above may then be followed by consideration of a baseline lubricant oil having a relatively high reactivity that provides non-optimum engine performance. Reference to relatively high reactivity lubricant oil and non-optimum engine performance may therefore amount to that feature where such high reactivity baseline oil is one that provides the lowest advanced relative spark timing, and/or lowest relative torque, and/or relatively low coolant temperature, and/or relatively low oil temperature, and/or relatively low inlet air temperature, and/or relatively low compression ratio. Such engine operating parameters are again established in the absence of knock that may be otherwise unacceptable for satisfactory combustion performance and prolonged engine operation. Preferably, such high reactivity baseline oil may therefore be one that provides any one or more of the aforementioned engine operating conditions with a knock intensity value herein of $\leq 0.15$.

Examples of high reactive lubricant for use as a baseline oil herein may include a single weight blended lubricant from a polyalpha-olefin (PAO) base stock, such as ExxonMobil SpectraSyn™ 10. Such PAO base stock may also include an additive package including anti-wear and anti-oxidation additives along with friction modifiers, as noted above. Another relatively high reactive lubricant oil may include a multi-weight commercially available formulation, also based on a PAO base stock, such as the synthetic lubricant oils sold under the name Mobil 1™.

From the above two baseline oils (low reactivity and high reactivity) one may then establish a reactivity index of 1 to 100, with 1 assigned to the low reactivity baseline oil and 100 assigned to the high reactivity baseline oil. That is, one may assume a linear progression between the assigned reactivity index of 1 and the assigned reactivity index of 100. At this point one may then evaluate a given lubricant oil and assign its value for its reactivity index on this generated baseline scale of 1 to 100. As may be appreciated, this will then inform one as to the engine operating conditions that may be required to manage knock intensity to levels of $\leq 0.15$, as disclosed herein.

In addition, aside from identifying the reactivity index of a given baseline oil, and the associated divergence from the high reactivity and low reactivity baseline oils noted above, one may also adjust the engine fuel composition until engine performance is adjusted back to that of the low reactivity baseline lubricant oil (i.e. most advanced relative spark timing and/or maximum relative torque and/or relatively high coolant temperature and/or relatively high oil temperature and/or relatively high inlet air temperature and/or relatively high compression ratio). Reference to the adjustment in fuel composition may be understood as modifying the octane rating of the fuel. That is, one may increase the level of octane in the fuel in response to the identification of a high reactivity lubricant oil, which is reference to the feature that the fuel itself is made relatively less reactive. By contrast, one may reduce the level of octane in the fuel in response to the identification of a low reactivity lubricant oil, which is reference to the feature that the fuel itself is made relatively more reactive.

Figure 4:
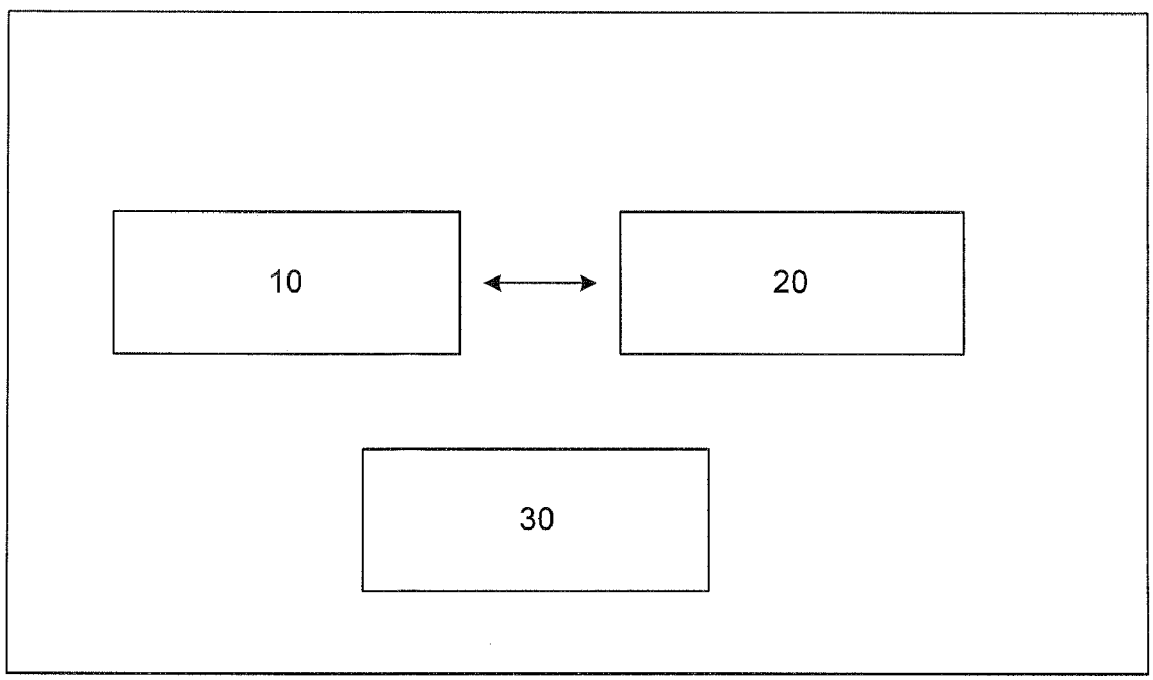
FIG. 4 illustrates an article comprising a storage medium, processor and user interface which executes the method of evaluating non-fuel components within a selected fuel with respect to engine knock performance in a selected spark-initiated combustion engine.

It should also be appreciated that the functionality described herein for the embodiments of the present invention may be implemented by using hardware, software, or a combination of hardware and software. If implemented by software, a processor and a machine readable medium are required. The processor may be of any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in either a compressed and/or encrypted format. Accordingly, in the broad context of the present invention, and with attention to FIG. 4, the apparatus or article herein that may execute the methods disclosed herein may contain a processor (10) and machine readable media (20) and user interface (30).

As can be seen, the present disclosure provides herein a methodology and engine based testing that may allow one to identify, for non-fuel components such as lubricant oils, reactivity and tendency to cause engine knock. Such identification of engine knock characteristics for a given lubricant may then allow one to consider several options, such as selection or modification of the lubricant reactivity to engine knock and/or the adjustment of engine operating parameters to regulate knock for a given lubricant. In addition, one may also now consider a change in engine fuel requirements to allow for the use of a given lubricant, while minimizing or eliminating the tendency of such lubricant to cause knock in a selected internal combustion engine.

What is claimed is:

1. A method for evaluating non-fuel components within a selected fuel with respect to engine knock performance in a selected spark-initiated combustion engine comprising:
   determining the onset of engine knock in said spark-initiated combustion engine for a first non-fuel component in a selected fuel mixture under engine operating conditions which provides optimum engine performance;
   determining the onset of engine knock in said spark-initiated combustion engine for a second non-fuel component in a selected fuel mixture under engine operating conditions which provides sub-optimum engine performance;
   determining the onset of engine knock for a selected non-fuel component in said selected fuel relative to said first and second non-fuel components in said spark-initiated combustion engine.

2. The method of claim 1 wherein said optimum engine performance comprises one or more of the following for said first non-fuel component, relative to said second non-fuel component: the most advanced relative spark timing, highest relative coolant temperature, highest relative oil temperature, high relative inlet air temperature, highest relative compression ratio.

3. The method of claim 1 wherein said sub-optimum engine performance comprises one or more of the following for said second non-fuel component, relative to said first non-fuel component: lowest advanced relative spark timing, lowest relative coolant temperature, lowest relative oil temperature, lowest relative inlet air temperature, lowest compression ratio.

4. The method of claim 1 wherein said determination of the onset of engine knock comprises identifying a knock intensity, comprising an integrated pressure versus crank angle location value, of less than or equal to 0.15.

5. The method of claim 1 wherein said determination of the onset of engine knock comprises identifying a knock intensity, comprising an integrated pressure versus crank angle location value, of greater than 0.15 and less than or equal to 0.5.

6. The method of claim 1 wherein said first non-fuel component comprises an ester base stock lubricant oil or an alkylated naphthalene base stock lubricant oil.

7. The method of claim 1 wherein said second non-fuel component comprises a polyalpha-olefin base stock lubricant oil.

8. The method of claim 1 wherein determining said onset of knock for said first non-fuel component in said fuel mixture under engine operating conditions which provides optimum engine performance comprises
   (a) identifying one of the following parameters for evaluation of the onset of engine knock: spark advance, coolant temperature, oil temperature, inlet air temperature, compression ratio;
   (b) holding the remaining parameters that are not identified in (a) for evaluation within targeted levels;
   (c) adjusting the parameter identified in (a) until there is the onset of engine knock for said first non-fuel component in said fuel mixture.

9. The method of claim 8 wherein said targeted levels for said parameters comprises setting the spark advance to +/−0.25 degrees, setting the coolant temperature to +/−1.0° C., setting the oil temperature to +/−1.0° C., setting the inlet air temperature to +/−0.5° C., setting the compression ratio to +/−0.1.

10. The method of claim 1 wherein determining said onset of knock for second first non-fuel component in said fuel mixture under engine operating conditions which provides optimum engine performance comprises
    (a) identifying one of the following parameters for evaluation of the onset of engine knock: spark advance, coolant temperature, oil temperature, inlet air temperature, compression ratio;
    (b) holding the remaining parameters that are not identified in (a) for evaluation within targeted levels;
    (c) adjusting the parameter identified in (a) until there is the onset of engine knock for said first non-fuel component in said fuel mixture.

11. The method of claim 10 wherein said targeted levels for said parameters comprises setting the spark advance to +/−0.25 degrees, setting the coolant temperature to +/−1.0° C., setting the oil temperature to +/−1.0° C., setting the inlet air temperature to +/−0.5° C., setting the compression ratio to +/−0.1.

12. The method of claim 1 including adjusting the composition of said selected fuel wherein said onset of engine knock for said selected non-fuel component is configured to provide the engine performance of said first non-fuel component.

13. The method of claim 1 wherein the onset of engine knock comprises the identification of pressure waves during combustion of 3.0 to 6.0 kHz.

14. A method for evaluating lubricant oils within a selected fuel with respect to engine knock performance in a selected spark-initiated combustion engine comprising:
    determining the onset of engine knock in said spark-initiated combustion engine for a first relatively low reactivity lubricant oil in a fuel mixture under engine operating conditions which provides optimum engine performance;
    determining the onset of engine knock in said spark-initiated combustion engine for a second relatively high reactivity lubricant oil in a fuel mixture under engine operating conditions which provides sub-optimum engine performance;
    determining the onset of engine knock for a selected lubricant oil relative to said first relatively low reactivity lubricant oil and said second relatively high reactivity lubricant oil in said spark-initiated combustion engine.

15. The method of claim 14 wherein said optimum engine performance comprises one or more of the following for said first relatively low reactivity lubricant oil relative to said second high reactivity lubricant oil: the most advanced relative spark timing, highest relative coolant temperature, highest relative oil temperature, high relative inlet air temperature, highest relative compression ratio.

16. The method of claim 14 wherein said sub-optimum engine performance comprises one or more of the following for said high reactivity lubricant oil, relative to said first low reactivity lubricant oil: lowest advanced relative spark timing, lowest relative coolant temperature, lowest relative oil temperature, lowest relative inlet air temperature, lowest compression ratio.

17. The method of claim 14 wherein said determination of the onset of engine knock comprises identifying a knock intensity, comprising an integrated pressure versus crank angle location value, of less than or equal to 0.15.

18. The method of claim 14 wherein said determination of the onset of engine knock comprises identifying a knock intensity, comprising an integrated pressure versus crank angle location value, of greater than 0.15 and less than or equal to 0.5.

19. The method of claim 14 wherein said first relatively low reactivity lubricant oil comprises an ester base stock lubricant oil or an alklylated naphthalene base stock lubricant oil.

20. The method of claim 14 wherein said second relatively high reactivity lubricant oil comprises a polyalpha-olefin base stock lubricant oil.

21. The method of claim 14 wherein determining said onset of knock for said first relatively low reactivity lubricant oil in a fuel mixture under engine operating conditions which provides optimum engine performance comprises
    (a) identifying one of the following parameters for evaluation of the onset of engine knock: spark advance, coolant temperature, oil temperature, inlet air temperature, compression ratio;
    (b) holding the remaining parameters that are not identified in (a) for evaluation within targeted levels;
    (c) adjusting the parameter identified in (a) until there is the onset of engine knock for said first relatively low reactivity lubricant oil in said fuel mixture.

22. The method of claim 21 wherein said targeted levels for said parameters comprises setting the spark advance to +/−0.25 degrees, setting the coolant temperature to +/−1.0° C., setting the oil temperature to +/−1.0° C., setting the inlet air temperature to +/−0.5° C., setting the compression ratio to +/−0.1.

23. The method of claim 14 wherein determining said onset of knock for second relatively high reactivity lubricant oil in a fuel mixture under engine operating conditions which provides optimum engine performance comprises
    (a) identifying one of the following parameters for evaluation of the onset of engine knock: spark advance, coolant temperature, oil temperature, inlet air temperature, compression ratio;
    (b) holding the remaining parameters that are not identified in (a) for evaluation within targeted levels;

(c) adjusting the parameter identified in (a) until there is the onset of engine knock for said relatively high reactivity lubricant oil in said fuel mixture.

24. The method of claim 23 wherein said targeted levels for said parameters comprises setting the spark advance to +/−0.25 degrees, setting the coolant temperature to +/−1.0° C., setting the oil temperature to +/−1.0° C., setting the inlet air temperature to +/−0.5° C., setting the compression ratio to +/−0.1.

25. The method of claim 14 including adjusting the composition of said selected fuel wherein said onset of engine knock for said selected non-fuel component is configured to provide the engine performance of said first non-fuel component.

26. The method of claim 14 wherein the onset of engine knock comprises the identification of pressure waves during combustion of 3.0 to 6.0 kHz.

27. An article comprising a non-transitory storage readable medium having stored thereon instructions that when executed by a machine result in the following operations:
 determining the onset of engine knock for a first non-fuel component in a selected fuel mixture under engine operating conditions which provides optimum engine performance;
 determining the onset of engine knock for a second non-fuel component in a selected fuel mixture under engine operating conditions which provides sub-optimum engine performance;
 determining the onset of engine knock for a selected non-fuel component in said selected fuel relative to said first and second non-fuel components.

* * * * *